United States Patent Office 3,574,166
Patented Apr. 6, 1971

3,574,166
HIGH MOLECULAR WEIGHT
POLYQUINAZOLONES
Eduard Radlmann, Gunter Lorenz, and Manfred Gallus, Dormagen, Jurgen Schramm, Solingen-Ohligs, and Gunther Nischk, Dormagen, Germany, assignors to Farbenfabriken Bayer Aktiengesellschaft, Leverkusen, Germany
No Drawing. Filed June 16, 1969, Ser. No. 833,779
Claims priority, application Germany, June 26, 1968,
P 17 70 707.2
Int. Cl. C08g 33/02
U.S. Cl. 260—49          2 Claims

ABSTRACT OF THE DISCLOSURE

High molecular weight polyquinazolones and a process for their production by polycondensation of a mixture of polymerhomologous primary aromatic diamines containing ether groups with dibenzoxazinones at temperatures of from 80 to 250° C.

---

The invention relates to high molecular weight, high melting polyquinazolones which are soluble in organic solvents, and to a process for their production.

It is known that polyquinazolones can be prepared by reacting dibenzoxazinones with low molecular weight aromatic diamines. The disadvantage of such materials is that they are sparingly soluble in organic solvents, so that they are extremely difficult to work up into shaped products, foils, fibres and lacquers.

It is an object of this invention to provide high molecular weight polyquinazolones that are easily soluble in organic solvents. It is another object of this invention to provide a process for the production of these polyquinazolones. These objects are accomplished by a high molecular weight polyquinazolone comprising recurring structural units of the general formula

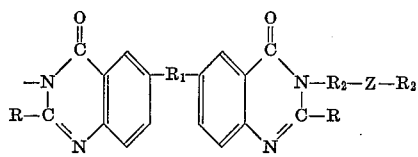

wherein

R represents an alkyl or aryl radical and
$R_1$ represents a single bond, a sulphonyl, carbonyl, oxygen, sulphur, alkylene, cycloalkylene or aralkylene radical, or a radical of the formula

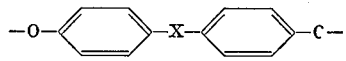

wherein

X represents oxygen, sulphur, sulphoxide, sulphonyl or carbonyl,
$R_2$ represents a phenylene, naphthalene or diphenylene radical substituted or not,
Z represents a group of the general formula

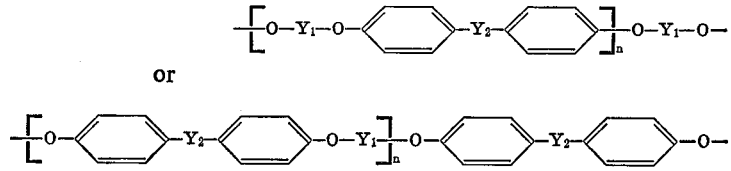

or wherein $Y_1$ represents a phenylene, naphthalene or diphenylene radical, substituted or not, or a radical of the formula

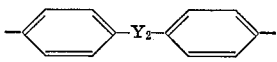

and $Y_2$ represents a sulphoxide, sulphonyl, carbonyl, oxygen, sulphur, lower alkylene, cycloalkylene or aralkylene radical, and
n represents an integer of from 2–20, said polyquinazolones having a relative solution viscosity $\eta_{rel}$ as measured on a solution of 0.2 g. of the polymer in 100 ml. chloroform at 25° C., of above 1.1 and a softening range of from 250° C. to 350° C.

The production of the polyquinazolones according to the invention is accomplished by a process for the production of high molecular weight polyquinazolones which comprises polycondensing a polymer homologous mixture of aromatic diamines of the general formula

$H_2N—N—R_2—Z—R_2—NH$ wherein $R_2$ represents a phenylene, naphthalene or diphenylene radical, substituted or not, and Z represents a group of the general formula

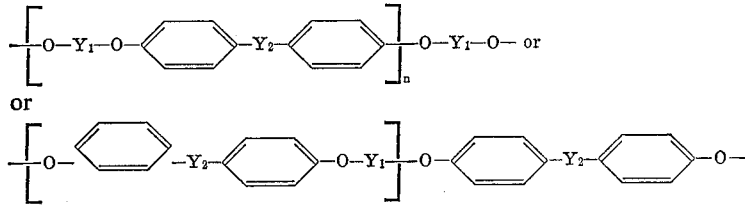

wherein $Y_1$ represents a phenylene, naphthalene or diphenylene radical, substituted or not, or a radical of the formula

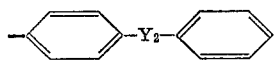

$Y_2$ represents a sulphoxide, sulphonyl, carbonyl, oxygen, sulphur, lower alkylene, cycloalkylene or aralkylene radical and $n$ represents an integer of from 2–20, with dibenzoxazinones of the general formula

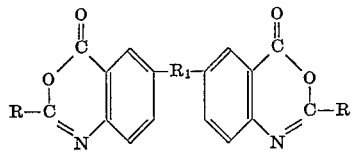

wherein

R represents an alkyl or aryl radical and $R_1$ represents a single bond, a sulphonyl, carbonyl, oxygen, sulphur, alkylene, cycloalkylene or aralkylene radical, or the radical

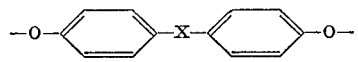

wherein

X represents oxygen, sulphur, sulphoxide, sulphonyl or carbonyl, said polycondensing being carried out in high boiling organic solvents at temperatures of 80° C. to 250° C., water being split off in the process.

The polycondensates according to the invention are readily soluble in organic solvents such as chloroform, carbon tetrachloride, dimethylformamide or N-methylpyrrolidone.

The polymer homologous mixtures of primary aromatic diamines used for the preparation of the polyquinazolones may be prepared, for example, by reacting aromatic polyethers which contain alkali metal phenolate end groups with aromatic halogenated hydrocarbons which have a nitro group in the ortho or para position, and hydrogenating the resulting dinitro compounds catalytically to the corresponding diamines. Thus, for example, an alkali metal salt of a bisphenol (4,4'-dihydroxydiphenyl) is reacted with an aromatic bishalogen compound (4,4'-di-chlorodiphenylsulphone) in a polar organic solvent (dimethylsulphoxide) at temperatures above 60° C. in a molar ratio which may range from slightly below 2:1 to slightly above 1:1; the polyether which carries alkali metal phenolate end groups is then further condensed with a halo-nitroaryl compound (4-nitrochlorobenzene); and the dinitro compound is hydrogenated in organic solvents with Raney nickel and hydrogen.

An aromatic polyether which carries halogen end groups, for example, may equally well be reacted with alkali metal salts of mononitrophenols to form the corresponding dinitro compounds which are then hydrogenated catalytically to the required diamines.

The amino end group content, i.e. the average molecular weight of the diamine, is determined by analytic method, e.g. titration with perchloric acid, so that it can be used in exact stoichiometric quantities for the condensation with dibenzoxazinones.

The following low molecular weight diamines may be used in admixture with the high molecular weight diamines up to a molar ratio of 1:1:

4,4'-diaminodiphenylether,
4,4'-diamino-diphenylmethane,
4,4'-diamino-diphenylpropane-(2,2),
1,3-diaminobenzene,
1,4-diaminobenzene,
4,4'-diamino-diphenylsulphone,
benzidine, 4,4'-diamino-diphenylsulphide,
3,3'-diamino-diphenylsulphone,
bis-(4-aminophenyl)-phosphine oxide,
m-xylylene-diamine,
2,6-diaminopyridine,
1,5-diaminonaphthalene,
3,3'-dimethyl-4,4'-diamino-diphenyl,
3,3'-dimethoxybenzidine,
1,5-di-(p-aminophenoxy)-naphthalene,
2,6-di-(p-aminophenoxy)-naphthalene,
4,4'-di-(p-aminophenoxy)-diphenyl,
4,4'-di-(p-aminophenoxy)-diphenylmethane,
4,4'-di-(p-aminophenoxy)-diphenylpropane-(2,2),
4,4'-di-(p-aminophenoxy)-diphenylether,
1,4-di-(p-aminophenoxy)-benzene,
4,4'-di-(p-aminophenoxy)-diphenylsulphide,
4,4-di-(p-aminophenoxy)-diphenylsulphone,
4,4'-di-(2''-chloro-4''-aminophenoxy)-diphenylpropane-(2,2) or
1,4-(2'-chloro-4'-aminophenoxy)-benzene.

Suitable di-benzoxazinones are any compounds which can be prepared from bis-anthranilic acids and organic acid anhydrides by known methods.

Suitable solvents for carrying out the condensation are those which have a high boiling point and are capable of dissolving the polymer and if possible also the starting components. In some cases, the starting materials are only partly soluble but the polymer is readily soluble so that the initial dispersion becomes a highly viscous solution when the reaction is coming to an end. Chlorobenzene, dichlorobenzene, N,N-dimethylacetamide, N,N-dimethylformamide, N-methylpyrrolidone and N-dimethylsulphoxide are mentioned as illustrative but not limiting examples.

In some cases it is advantageous to add drying agents to the polycondensation reaction medium. Thus the water eliminated during the reaction is bound and can no longer react with nonreacted di-benzoxazinone. As drying agents can be used for example sodium sulfate, copper sulfate, calcium chloride and $P_2O_5$.

In a preferred embodiment of the process according to the invention, the polymer homologous diamine mixture and the di-benzoxazinone are dispersed in preferably equivalent quantities in a suitable solvent and condensed at temperatures in the range of 80° C. to 250° C., preferably 120° C. to 200° C., for reaction times of 1 to 30 hours while nitrogen is passed over. In principle, the reaction may also be carried out with one of the two components in excess. The solids content may lie between 5 and 40% and is preferably between 15 and 25%. After the polycondensation has come to an end, the polymer is precipitated by pouring the solution into an excess of water or organic precipitating agent, or the solutions may also be worked up directly into threads and foils without isolation of the polymer.

The new polyquinazolones are distinguished by extremely good mechanical, thermal and electrical properties, and, owing to their excellent solubility in many organic solvents, they can be worked up into threads, fibres and foils by known processes, but they may also be formed from the melt into threads and fibres and into moulded products by the injection moulding process.

The following examples are to further illustrate the invention without limiting it.

The parts by weight are related to parts by volume as are kg. to litres.

In the examples, the values for the relative viscosities were determined in chloroform at 25° C., the concentration being 0.2 g. of polymer in 100 ml. of solution.

EXAMPLE 1

116.4 parts by weight of the polymer homologous ether di-amine mixture of the formula

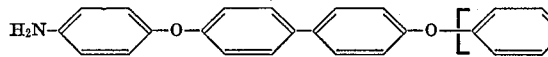

(mol. wt.=1940)

and 19.8 parts by weight of the di-benzoxazinone of the formula

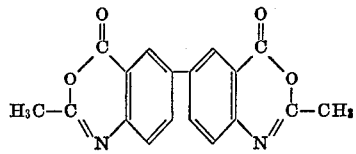

are heated at 180° C. in 400 parts by weight of N-methylpyrrolidone while nitrogen is passed over, and are stirred at this temperature for 15 hours. The highly viscous solution is then diluted with more solvent to a solids content of about 15%, and the polymer is precipitated by pouring it into vigorously stirred water. After suction filtration, the precipitate is washed twice with water and dried in a vacuo a 100° C. 128.5 parts by weight of the polyquinazolone, which has a melting range of 285° to 350° C. and a relative viscosity $\eta_{rel}$ of 1.63 are isolated. The polyquinazolone is readily soluble in chloroform in the cold.

Preparation of the aromatic ether diamine

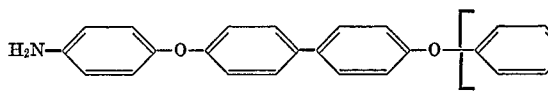

(mol. wt.=1940)

465 parts by weight of 4,4'-dihydroxydiphenyl are dissolved in 4000 parts by volume of dimethylsulphoxide under a nitrogen atmosphere. After the addition of 280.5 parts by weight of solid 100% potassium hydroxide and dissolving at 100° C., the water resulting from salt formation is distilled off in vacuo at about 15 mm. Hg together with about 10% dimethylsulphoxide. 574 parts by weight of 4,4'-dichlorodiphenylsulphone are then added. The reacatnts are condensed for 8 hours while the reaction mixture is stirred and nitrogen is passed over. 236 parts by weight of 4-nitrochlorobenzene are then added. Condensation is then continued for another 5 hours under nitrogen at 125° C. After removal of the main part of the dimethylsulphoxide by vacuum distillation, the dinitro compound is precipitated with water and the excess 4-nitro-chlorobenzene is removed by steam distillation. After drying in vacuo at 100° C., 915 parts by weight of the mixture of ether sulphone oligomers which have nitro end groups is isolated. The compound melts in the range of from 228 to 244° C.

805 parts by weight of the dinitro compound are dissolved in 3000 parts by volume of N-methylpyrrolidone and hydrogenated in an autoclave for 3 hours at 120° C. and a hydrogen pressure of 50 atmospheres, using 70 parts by weight of Raney nickel. After removal of the reducing catalyst, the main part of the solvent is removed by vacuum distillation and the concentrated solution is precipitated in 1000 parts by volume of water with vigorous stirring, isolated by suction filtration and dried in vacuo at 100° C. 751 parts by weight of the polymer homologous diamine mixture are obtained in pure form. The material melts in the region of from 239 to 249° C. Amino end group analysis by titration with perchloric acid reveals an average molecular weight of 1940.

EXAMPLE 2

116.4 parts by weight of the polymer homologous ether diamine mixture of the formula

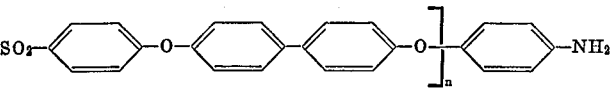

(for preparation see Example 1) (M.W.=1940)

and 34.08 parts by weight of the di-benzoxazinone of the formula

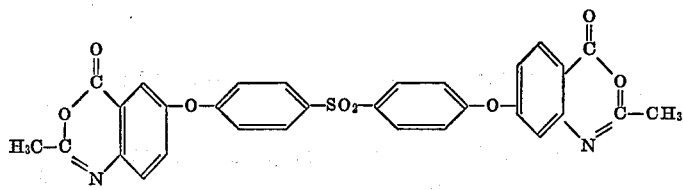

having a melting point of 203–205° C. are heated at 160° C. in 593 parts by weight of N-methylpyrrolidone while nitrogen is passed over, and the reaction mixture is condensed for 24 hours with stirring. The viscous solution is diluted to a solids content of 15% with more solvent. The polymer is isolated by precipitating the solution in water, separated by suction filtration, washed with water and methanol and dried in vacuo at 100° C. 139.2 parts by weight of the polyquinazoline which has a melting range of 273 to 321° C. and a relative viscosity $\eta_{rel}$=1.58 are isolated. The polymer is soluble in chloroform.

Preparation of the di-benzoxazinone used in this example 1 part by weight of 4,4'-bis(4-amino-3-carboxyphenoxy)-diphenylsulfone are heated in 2 parts by weight of acetic acid anhydride for 2 hours at 110–120° C. After cooling to 70–80° C. to the reaction mixture are added 2.2 parts by weight of acetonitrile. The precipitate is filtered by suction after cooling to room temperature. After repeating this procedure once more the precipitate

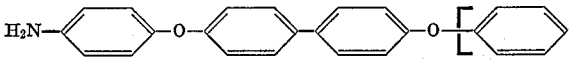

thus obtained is washed with acetontrile and dried in vacuo at 100° C. over KOH. Yield 0.87 part by weight (79%). M.P. 203–205° C.

EXAMPLE 3

150 parts by weight of the polymer homologous ether diamine mixture of the formula

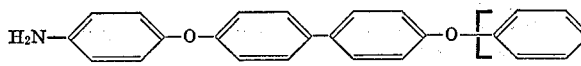

(M.W.=1500)
and 32.0 parts by weight of the di-benzoxazinone of the formula

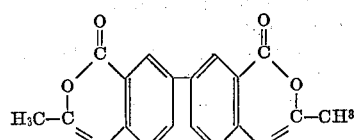

are heated to 150° C. in 1011 parts by weight of dimethyl acetamide while nitrogen is passed over, and the reactants are condensed for 48 hours. The resulting polymer is isolated by precipitating the solution in water. 169.5 parts by weight of the polyquinazolone which has a melting range of 264–298° C. and a relative viscosity $\eta_{rel}$=1.32 are obtained. The polymer is very readily soluble in chloroform.

Preparation of polymer homologous mixture of aromatic ether diamines of the formula

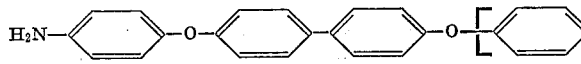

(M.W.=1500)

372 parts by weight of 4,4'-dihydroxydiphenyl are dissolved in 8000 parts by volume of dimethylsulphoxide under nitrogen. After the addition of 161.7 parts by weight of sodium hydroxide (99%) dissolved in 170 parts by volume of water, the water resulting from salt formation together with the added water and 1500 parts by volume of dimethylsulphoxide are distilled off in vacuo at 70 to 80° C./15 mm. Hg 430.5 parts by weight of 4,4'-dichloro-diphenylsulphone are then added. The reactants are condensed for 8 hours with stirring while nitrogen is passed over. 236 parts by weight of 4-nitrochlorobenzene are then added and condensation is continued for another 5 hours at 125° C. After removal of the main part of the dimethyl sulphoxide in vacuo the reaction mixture is precipitated with water, and excess 4-nitrochlorobenzene is removed by steam distillation. After drying in vacuum at 100° C., 805 parts by weight of the polymer homologous ether sulphone which has nitro end groups and which has a softening range of 159 to 188° C. are obtained. 805 parts by weight of the dinitro compound are dissolved in 4500 parts by volume of N-methylpyrrolidone and hydrogenated in an autoclave for 1.5 hours at 120° C. under a hydrogen pressure of 40 excess atmospheres, using 80 parts by weight of Raney nickel. After filtration of the reducing catalyst, the main part of the solvent is removed by vacuum distillation and the concentrated solution is precipitated with water with vigorous stirring, removed by suction filtration and dried in vacuo at 100° C. 695 parts by weight of the polymer homologous diamine mixture are obtained. The material melts in the region of 166–192° C. Amino end group analysis by titration with perchloric acid indicates an average molecular weight of 1500.

EXAMPLE 4

97.0 parts by weight of the polymer homologous ether diamine mixture of the formula

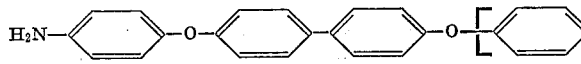

(M.W.=1940) (prepared according to Example 1), 19.2 parts by weight of the di-benzoxazinone of the formula

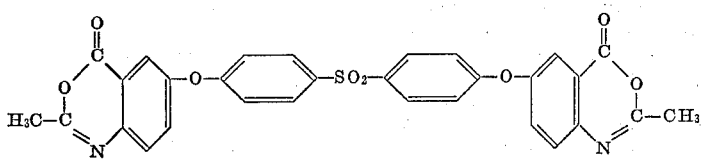

and 5 parts by weight of $P_2O_5$ are polycondensed by heating to 190° C. in 425 parts by weight of N-methylpyrrolidone for 24 hours while stirring and passing nitrogen over the reaction medium. Thereafter the solution is diluted with more solvent to a concentration of 15% by weight.

The polymer is precipitated by pouring the solution into water, suction filtered, washed with water and methanol and dried at 100° C. in vacuo. 101.5 parts by weight of the polyquinazolone are isolated, having a melting range of 274–325° C. and a relative solution viscosity $\eta_{rel}$ of 1.71.

The polymer is soluble in chloroform.

What we claim is:

1. The high molecular weight polyquinazolone consisting essentially of recurring structural units of the general formula

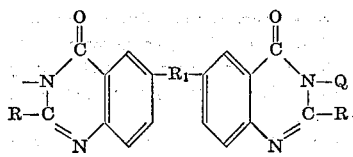

wherein Q is a member selected from the group consisting of (1) 100 mole percent of the member —R₂—Z—R₂— and (2) at least 50 mole percent of said members —R₂—Z—R₂— wherein the remainder is selected from the group consisting of the bivalent radicals
  phenylene
  diphenylene
  diphenylene ether
  diphenylene methane
  diphenylene propane
  diphenylene sulfone
  diphenylene sulfide
  diphenylene phosphineoxide
  xylylene
  pyridinylene
  naphthylene
  dimethyl diphenylene
  dimethoxy diphenylene
  diphenyloxy napthalene
  diphenyloxy diphenyl
  diphenyloxy diphenylmethane
  diphenyloxy diphenylpropane
  diphenyloxy dichlorodiphenylpropane
  diphenyloxy diphenylether
  diphenyloxybenzene
  diphenyloxy dichlorobenzene
  diphenyloxy diphenyl sulfide and
  diphenyloxy diphenyl sulfone R represents methyl;
R₁ represents a single bond or

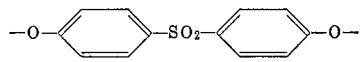

R₂ represents phenylene;
Z represents and $n$ represents an integer of from 2–20, said polyquinazolones having a relative solution viscosity as measured on a solution of 0.2 of the polymer in 100 ml. chloroform at 25° C. of above 1.1 and a softening range of from 250° C. to 350° C.

2. Polymers of claim 1 wherein Q is 100% of the member —R₂—Z—R₂—.

References Cited
UNITED STATES PATENTS
3,408,326  10/1968  Errede _____ 260—47

WILLIAM H. SHORT, Primary Examiner
L. L. LEE, Assistant Examiner

U.S. Cl. X.R.
260—30.2, 30.8, 32.6, 33.8, 47, 65, 78